United States Patent [19]

Yoshida et al.

[11] Patent Number: 5,371,887

[45] Date of Patent: Dec. 6, 1994

[54] TIME-SHARED MULTITASK EXECUTION DEVICE

[75] Inventors: Kohichi Yoshida, Mishima; Mikio Ogisu, Kyoto, both of Japan

[73] Assignee: Matsushita Electric Industrial Co., Ltd., Osaka, Japan

[21] Appl. No.: 995,531

[22] Filed: Dec. 22, 1992

Related U.S. Application Data

[63] Continuation of Ser. No. 402,813, Sep. 5, 1989, abandoned.

[51] Int. Cl.⁵ .................. G06F 12/06; G06F 13/36
[52] U.S. Cl. ........................... 395/650; 364/240; 364/254.5; 364/251; 364/281.8; 364/284; 395/800
[58] Field of Search .................. 395/200, 650, 800

[56] References Cited

U.S. PATENT DOCUMENTS

| | | | |
|---|---|---|---|
| 4,837,676 | 6/1989 | Rosman | 364/200 |
| 4,847,755 | 7/1989 | Morrison et al. | 364/200 |

Primary Examiner—Kevin A. Kriess
Assistant Examiner—John Q. Chavis
Attorney, Agent, or Firm—Wenderoth, Lind & Ponack

[57] ABSTRACT

A time-shared multitask execution device processes two or more tasks in time-shared manner by using one CPU. A common set of a control register group and a queue selection control part are provided for plural task execution queue for executing plural tasks. Under the control of the control register group and queue selection control part, one CPU is occupied by the plural task execution queues in a time-shared manner, so that the plural tasks may be processed concurrently. The user has only to set the information necessary for the register in the control register group according to the user's specification, and the task execution specification can be determined. Therefore, even in the case of a user with a limited knowledge about the program, the desired specification can be set only by setting a flag bit of information to 1 or 0 in a register which is a part of the "hardware".

5 Claims, 16 Drawing Sheets

FIG. 2(A)

| | | | | | U | P | M1 | M0 |
|---|---|---|---|---|---|---|---|---|
| | MSB bp7 | | | | | | | LSB bp0 |
| SUPERVISOR | r/w ||||||||
| USER | r |||| r/w | r |

(bp7 = MSB, bp0 = LSB; bits bp7–bp4 unused, bp3 = U, bp2 = P, bp1 = M1, bp0 = M0)

FIG. 2(B)

| M1 | M0 | QUEUE SELECTION MODE |
|---|---|---|
| 0 | 0 | (AUTOMATIC QUEUE SELECTION MODE CANCELLATION) |
| 0 | 1 | AUTOMATIC QUEUE SELECTION OF EACH COMMAND |
| 1 | 0 | PROGRAM QUEUE SELECTION |
| 1 | 1 | TIME SLICE AUTOMATIC QUEUE SELECTION |

FIG. 2(C)

| | QUEUE 7 | QUEUE 6 | QUEUE 5 | QUEUE 4 | QUEUE 3 | QUEUE 2 | QUEUE 1 | QUEUE 0 |
|---|---|---|---|---|---|---|---|---|
| | MSB bp7 | | | | | | | LSB bp0 |
| SUPERVISOR | r/w ||||||||
| USER | r/(w) ||||||||

FIG. 2(D)

| | | | | | | bp2 | bp1 | bp0 | |
|---|---|---|---|---|---|---|---|---|---|
| | MSB | | | | | | | LSB | |
| SUPERVISOR | — |||||| r/w ||| |
| USER | — |||||| r ||| |
| EXECUTION QUEUE | |||||| 0 | 0 | 0 | QUEUE 0 |
| | |||||| 0 | 0 | 1 | QUEUE 1 |
| | |||||| 0 | 1 | 0 | QUEUE 2 |
| | |||||| 0 | 1 | 1 | QUEUE 3 |
| | |||||| 1 | 0 | 0 | QUEUE 4 |
| | |||||| 1 | 0 | 1 | QUEUE 5 |
| | |||||| 1 | 1 | 0 | QUEUE 6 |
| | |||||| 1 | 1 | 1 | QUEUE 7 |

FIG. 2(E)

| | MSB | | | | | | | LSB | |
|---|---|---|---|---|---|---|---|---|---|
| | — | — | — | — | — | bp2 | bp1 | bp0 | |
| SUPERVISOR | | | — | | | | r/w | | |
| USER | | | — | | | | r | | |
| EXECUTION QUEUE | | | | | | 0 | 0 | 0 | QUEUE 0 |
| | | | | | | 0 | 0 | 1 | QUEUE 1 |
| | | | | | | 0 | 1 | 0 | QUEUE 2 |
| | | | | | | 0 | 1 | 1 | QUEUE 3 |
| | | | | | | 1 | 0 | 0 | QUEUE 4 |
| | | | | | | 1 | 0 | 1 | QUEUE 5 |
| | | | | | | 1 | 1 | 0 | QUEUE 6 |
| | | | | | | 1 | 1 | 1 | QUEUE 7 |

FIG. 2(F)

| | MSB bp7 | | | | | | | LSB bp0 |
|---|---|---|---|---|---|---|---|---|
| | QUEUE 7 | QUEUE 6 | QUEUE 5 | QUEUE 4 | QUEUE 3 | QUEUE 2 | QUEUE 1 | QUEUE 0 |
| SUPERVISOR | | | | r/w | | | | |
| USER | | | | r | | | | |

FIG. 2(G)

| | MSB | | | | | | | LSB |
|---|---|---|---|---|---|---|---|---|
| | bp7 | bp6 | bp5 | bp4 | bp3 | bp2 | bp1 | bp0 |
| TIME SETTING REGISTER a. | — | CORRESPONDING TO QUEUE 1 | | | — | CORRESPONDING TO QUEUE 0 | | |
| TIME SETTING REGISTER b. | — | CORRESPONDING TO QUEUE 3 | | | — | CORRESPONDING TO QUEUE 2 | | |
| TIME SETTING REGISTER c | — | CORRESPONDING TO QUEUE 5 | | | — | CORRESPONDING TO QUEUE 4 | | |
| TIME SETTING REGISTER d | — | CORRESPONDING TO QUEUE 7 | | | — | CORRESPONDING TO QUEUE 6 | | |
| SUPERVISOR | | | | r/w | | | | |
| USER | | | | r | | | | |

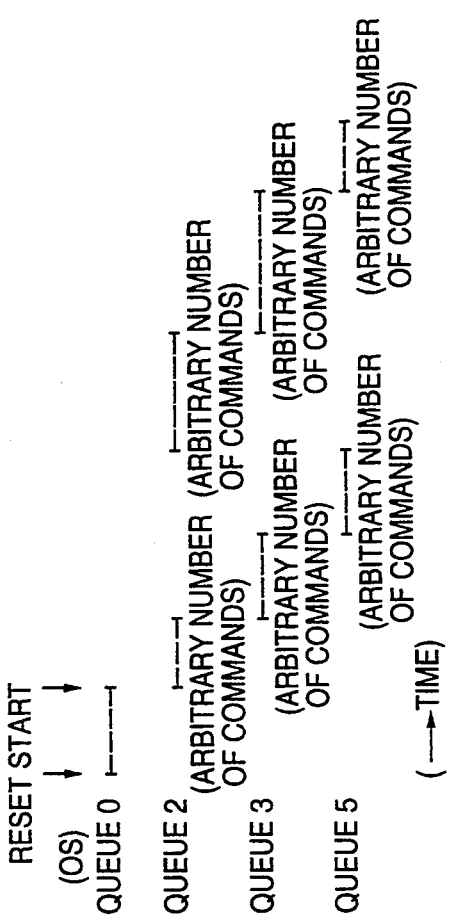

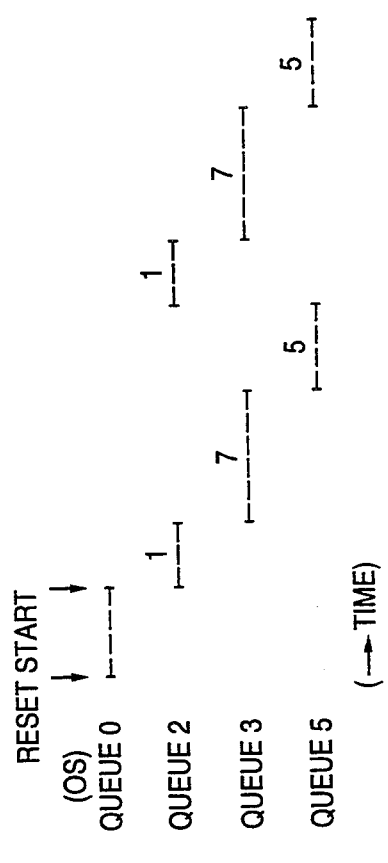

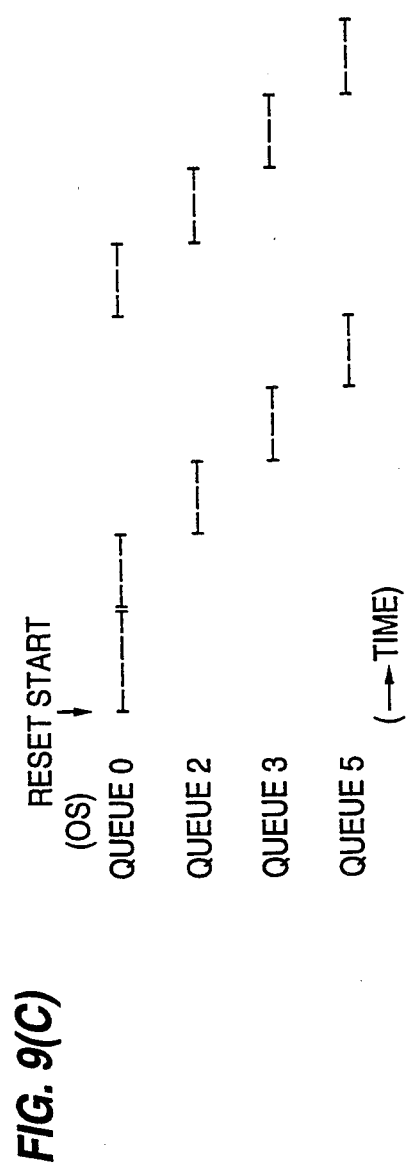

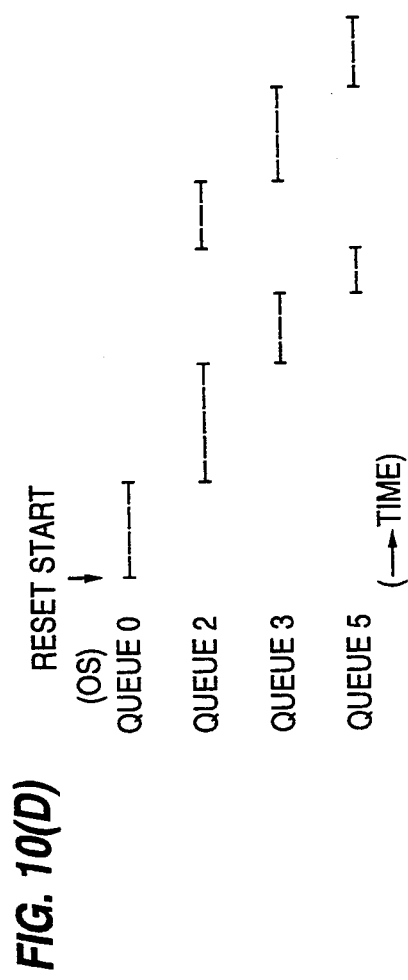

FIG. 11(A)
| QUEUE SELECTION MODE REGISTER 11 | MSB bp7 | | | | U | P | M1 | LSB bp0 M0 |
|---|---|---|---|---|---|---|---|---|
| | — | — | — | — | 0 | 0 | 0 | 0 |
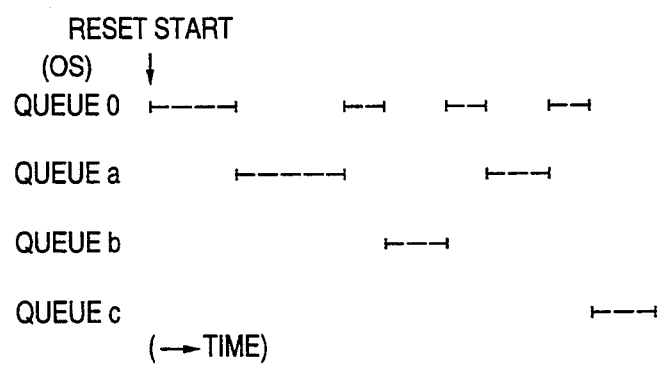
FIG. 11(B)
FIG. 12(A)
| QUEUE SELECTION MODE REGISTER 11 | MSB bp7 | | | | U | P | M1 | LSB bp0 M0 |
|---|---|---|---|---|---|---|---|---|
| | — | — | — | — | 1 | 0 | 0 | 0 |
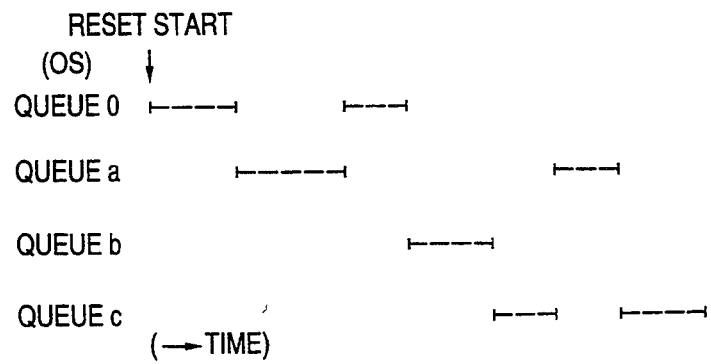
FIG. 12(B)

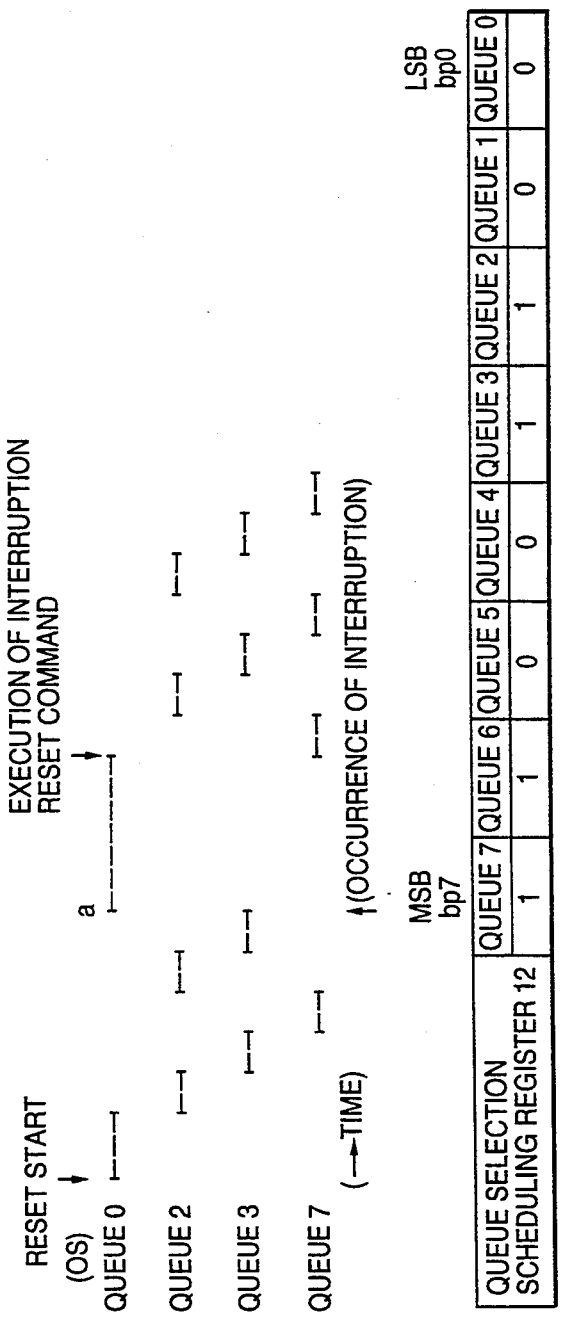
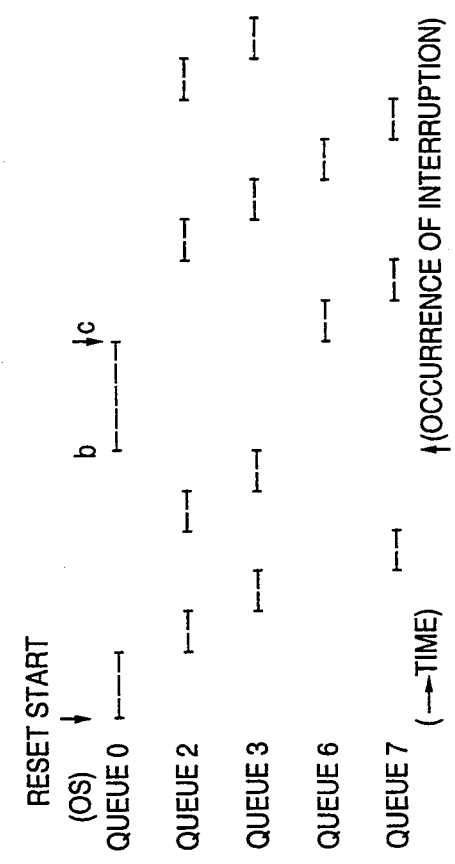
FIG. 13
FIG. 14(A)
FIG. 14(B)

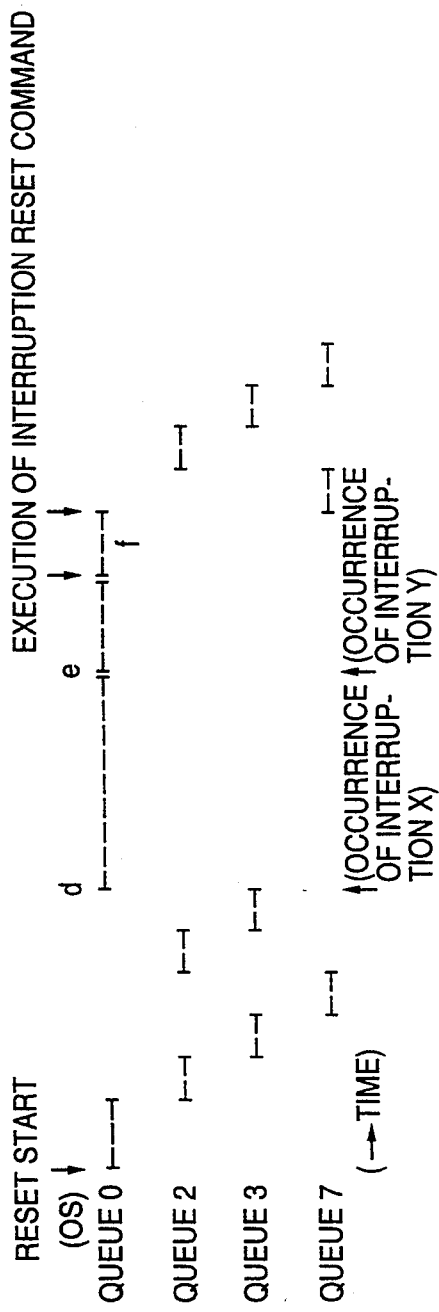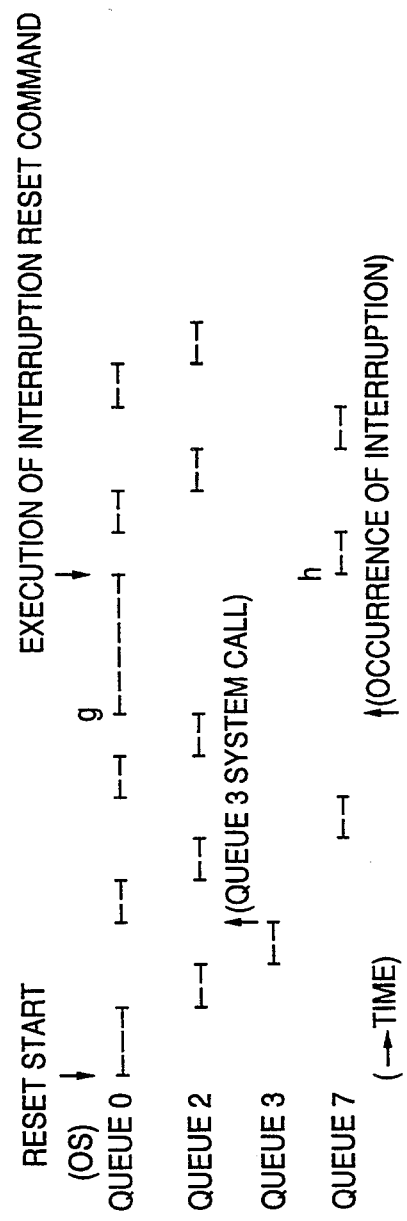
FIG. 15
FIG. 16

TIME-SHARED MULTITASK EXECUTION DEVICE

This application is a continuation of now abandoned application, Ser. No. 07/402,813, filed Sep. 5, 1989, now abandoned.

BACKGROUND OF THE INVENTION

This invention relates to a time-shared multitask execution device for time-shared processing of two or more tasks by using one central processing unit (CPU).

When executing task using a microprocessor, in a most common method, a set of register files consisting of a register group, stack pointers, status registers, etc. are prepared for one CPU, and the tasks are executed while transferring necessary data into the register files according to commands from the CPU. In this method, however, only one task can be executed at a time, and the execution efficiency is poor. Therefore, it has been hitherto considered to use a set of register files provided for one CPU in time-shared manner and to execute plural tasks in time shared manner. The most typical of these methods is to select one task after another at every command of the CPU. In this method, however, since two or more tasks are executed by selecting sequentially at every command, the priority order of the execution time of plural tasks cannot be determined. Still more, every time the tasks are selected, the data so far stored in the register data must be once stored in the memory (stack) region, and a processing step is needed to call the data necessary for the next task into the register files from other memory space or the like. During this data selection time, the task cannot be executed and hence the time loss is significant.

on the other hand, instead of such task selection at every command, a method of selecting tasks by interruption or other processing with a help of computer program in controlling the timing of plural tasks is also known. According to this method, it is also possible to determine the priority order of the execution time of plural tasks in advance when creating the program. For some type of program, however, it requires an advanced understanding about the program data in order to set the priority order, and it is very difficult to create an acceptable program for the user's specification and preset the priority order. In this case, too, since there is only one set of register files for one CPU, it is necessary to repeat data storing in calling for selecting the tasks, and the resultant time loss is not eliminated.

To solve the above problems, it has been proposed to prepare plural register files for one CPU, select a multiplexer according to a command from the CPU, and execute plural tasks in a time-shared manner while sequentially selecting the plural register files. In this way, since one register file is prepared for one task, it is not necessary to store or call the data when selecting tasks, and therefore the time loss is eliminated. In this case, again, selection setting of plural tasks and the priority order of execution of each task must be set by the program. It is a burden for the user to create a program according to the user's specification.

Thus, conventionally, in order to execute plural tasks by one CPU, it is required to set the selection schedule of tasks and priority order of execution time of each task in the program, such being a substantial burden for the user.

SUMMARY OF THE INVENTION

Hence, a primary object of this invention is to provide a time-shared multitask execution device without the above mentioned conventional problems.

To achieve the above object, the time-shared multitask execution device of this invention comprises one common set of a control register group and queue selection control part for plural task execution queues for executing plural tasks respectively, in which, under the control of such a control register group and queue selection control part, one CPU is occupied by plural task execution queues in a time-shared manner, so that plural tasks are processed concurrently.

Thus, the user has only to set necessary information in the registers in the control register group according to the user's specification, so that the task execution specification may be set. Therefore, the user, even if not having sufficient knowledge about the program, can set a desired specification by only setting the information of 1 or 0 on the register which is a part of the "hardware".

As such, the burden on the user when setting the multitask execution specification can be notably alleviated.

BRIEF DESCRIPTION OF THE DRAWINGS

FIG. 2A is a diagram showing the composition of a queue selection mode register 11;

FIG. 2B is a diagram showing the setting method of M1, M0 flags of the queue selection mode register 11;

FIG. 2C is a diagram showing the composition of a queue selection scheduling register 12;

FIG. 2D is a diagram showing the composition of running queue register 13;

FIG. 2E is a diagram showing the composition of an executed queue register 14;

FIG. 2F is a diagram showing the composition of an executed queue history register 15;

FIG. 2G is a diagram showing the composition of a task execution schedule time setting register 16;

FIGS. 6A, B, C are diagrams showing setting examples and behavior examples of registers in the program selection mode;

FIGS. 7A, B, C, D are diagrams showing setting examples and behavior examples of registers in time slice automatic queue selection mode;

FIGS. 9A, B, C are diagrams showing setting examples and action examples of registers when queue 0 is also selected automatically in the automatic queue selection mode of each command;

FIGS. 10A, B, C, D are diagrams showing setting examples and behavior examples of registers when selection program queues;

FIGS. 11A, B are diagrams showing setting examples and behavior examples of registers when selecting the queues by operating system (queue 0) control;

FIGS. 12A, B are diagrams showing setting examples and behavior examples of registers when selecting the queues by rewriting the value of a queue scheduling register (program queue selection without the help of the operating system);

FIG. 13 is a diagram showing the interruption processing when selecting the queue;

FIGS. 14A, B are diagrams showing setting examples and behavior examples of registers when selecting the queues;

FIGS. 15, 16 are diagrams showing the behavior of interruption during system call processing.

DETAILED DESCRIPTION OF THE INVENTION

Figure 1:
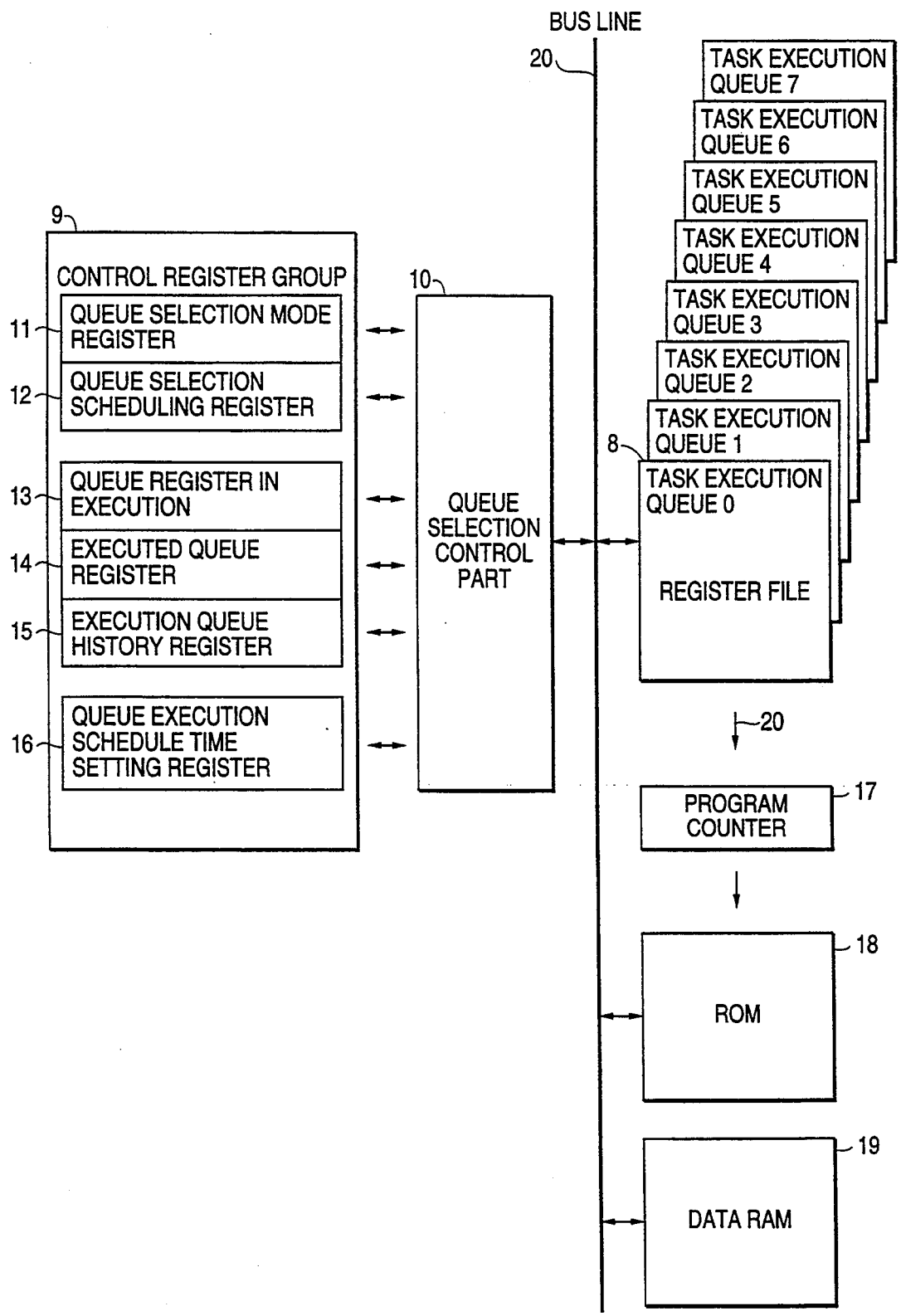
FIG. 1 is a block diagram of a time-shared multitask execution device according to one of the embodiments of the invention.

Referring now to the drawings, one of the embodiments of the invention is described in detail below.

FIG. 1 shows a configuration of an embodiment of the invention. The time-shared multitask execution device of this embodiment is realized by one microprocessor, and eight task execution queues (referred to simply as "queues" hereinafter) 0 to 7 are disposed for one CPU (not shown). Each one of queues 0 to 7 is provided with a register file 8 consisting of a register group, data register, address pointer, etc., and the task is executed while referring to the data and address stored in each register file 8. In order to control the execution sequence and execution time of these queues 0 to 7, a control register group 9 and a queue selection control part 10, both common to all queues 0 to 7, are provided. That is, the plural queues 0 to 7 occupy one CPU in a time-shared manner under the control of the control register group 9 and queue selection control part 10, and up to eight tasks are processed concurrently by sharing CPU time.

The control register group 9 is composed of queue selection mode register 11, queue selection scheduling register 12, running queue register 13, executed queue register 14, execution queue history register 15, and queue execution schedule time setting register 16. A program counter 17 receives an address data from the register in the register file 8 of each of queues 0 to 7, and indicates the address of the command being executed at the current or the following commands. In a ROM 18, the object code is stored and the commands are executed sequentially according to the addresses from the program counter 17. A data RAM 19 sequentially reads and writes various data that come up during the execution of commands. The arrow head lines shown between blocks and the middle line 20 are the bus lines for the data or addresses.

The queue selection mode register 11 is a register for control of a queue selection mode, and as shown in FIG. 2A, includes eight bit positions bp 0 to bp 7. Four flags M0 (mode 0), M1 (mode 1), P (program), and U (user) set respectively at bp 0, bp 1, bp 2, bp 3. Depending on whether M0 flag, and M1 flag are set at 0 or 1, the queue selection mode is determined as shown in FIG. 2B. That is by these flags, the following settings are enabled.

(0) Cancellation of automatic queue selection mode.

(1) Mode for automatically selecting the queues every time one command is executed (command mode).

(2) Mode for executing the selection command of queue by program (program mode).

(3) Mode for occupying the CPU for the time specified by the queue execution schedule time setting register 16, and selecting the queues when the time expires (time-slice mode).

Meanwhile, the P flag is used in the mode of executing the command for selecting the queue by program [program mode (2) above], and when 1 is set for P, the queue is switched to the next one automatically. After the queue switching, the P flag is set to 0. In FIG. 2A and in subsequent diagrams, r/w indicates that both read and write are possible, and r denotes that only read is possible. As shown in FIG. 2A, at the queue selection mode register 11, in the supervisor mode, both read and write are allowed (r/w) at all of bit points bp 0 to bp 7, while in the user mode, only the P flag of bp 2 is r/w, and for the others, only read (r) is allowed. Therefore, the P flag is always r/w, whether in the supervisor mode or in user mode, so that the queue can be selected in the program. When the U flag is set to 1, the queue selection scheduling register 12 becomes r/w from the user mode, so that the task execution queue can be selected in the user program. When the U flag is set to 1, the automatic queue selection mode is cancelled.

The queue selection scheduling register 12 is a register for executing the queue by setting the bit of the queue to be executed to 1. Its composition is shown in FIG. 2C. The ordinary queue selection, such as under control of the operating system, is effected by rewriting this queue selection scheduling register 12, and in the automatic queue selection mode [plural bits can be specified only in the cases of (1), (2), (3) above], this queue selection scheduling register 12 is referred to, and the queues are selected one after another without time loss; in the mode (0) other than the automatic queue selection mode after the queue selection, this register value is cleared. As mentioned above, when the U flag of the queue selection mode register 11 is set to 1, the queue selection scheduling register 12 is allowed to read/write from the user mode, and task execution queue can be selected in the user program (this state is indicated as r/(w) in FIG. 2C).

The running queue register 13 is a register for denoting the queue being executed, and its composition is shown in FIG. 2D. Values from 000 to 111 are set in bp 0 to bp 2, corresponding to queue 0 to 7 being executed.

The executed queue register 14 is a register showing the queue number of the previous execution, and its composition is shown in FIG. 2E. This executed queue register 14 is, like the running queue register 13 shown in FIG. 2D, provided with values from 000 to 111 in bp 0 to bp 2, corresponding to the already executed queues 0 to 7.

The queue execution history register 15 is a register to show the history of the executed queues, and its composition is shown in FIG. 2F. Queues 0 to 7 correspond to bit positions bp 0 to bp 7, respectively and 1 is set in the bit position of a executed queue, and the history of the executed queues is shown.

The above running queue register 13, executed queues register 14, and queue execution history register 15 are mainly used when the operating system controls the tasks and queues. Therefore these registers are not directly related with the fundamental function of this invention.

The task execution schedule time setting register 16 is used in the time-slice mode [case (3)], and is for setting the queue execution time. Its composition is shown in FIG. 2G. Four time-setting registers a to d are provided, and by setting 0 or 1 in bp 0 to bp 2 and bp 4 to bp 6 of each of registers a to d, each CPU time of the queues 0 to 7 is weighted, and the priority order of the tasks to be executed by the queues 0 to 7 can be set. For example, when 000 is set in bp 0 to bp 2 of time-setting register a, and 111 is set in bp 4 to bp 7 of time-setting register d, queue 0 has the lowest priority order and queue 7 has the highest priority order.

Next is explained the basic operation of the queue selection and the register setting method. The basic operation for automatic queue selection occurs in two manners.

(A) Selecting queues 1 to 7 automatically (when the operating system is in queue 0).

(B) Selecting queues 0 to 7 automatically. The basic operation of cases (A) and (B) and the register setting method are described below.

(A) When selecting queues 1 to 7 automatically (when the operating system is in queue 0), the queue 1 to 7 are automatically selected incrementally, and queue 0 is initiated system call or interruption. The system call denotes an exceptional processing to be carried out in synchronism with the execution of a task, while the interruption denotes processing of an event occurring synchronously with the execution of a task.

During a system call, the queue with the system call is suspended, and the system call is executed by queue 0, and the queues 0 to 7 are automatically selected from 0 to 7 sequentially. The queue with the system call remains suspended until the system call is over. After recovery from system call, the queues 1 to 7 are sequentially and automatically selected.

Figure 3A:
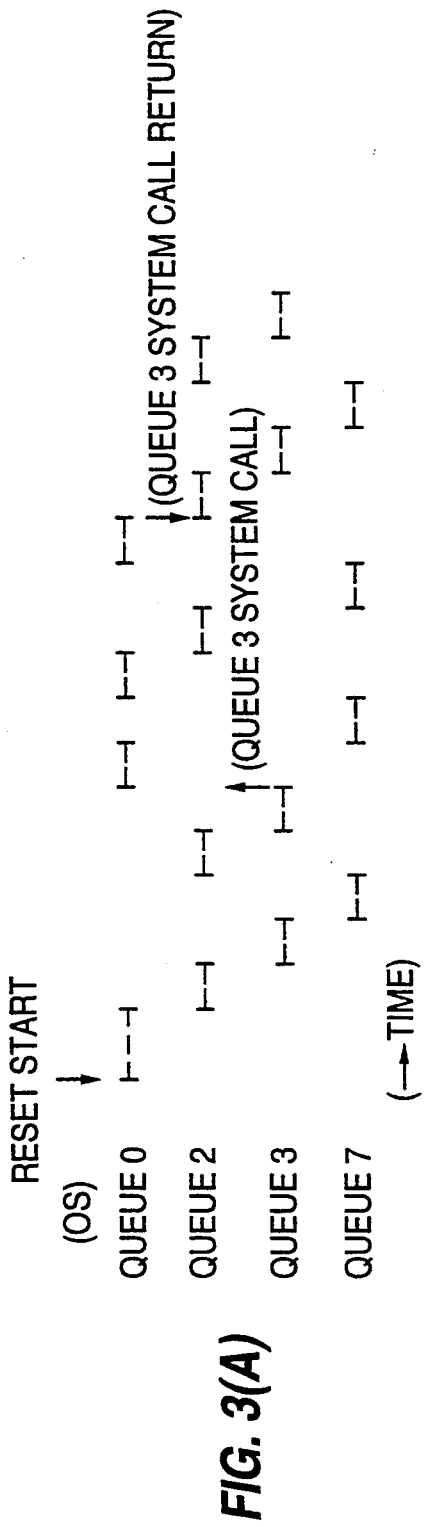
FIGS. 3A and 3B are diagrams showing examples of occurrence of a system call by queue 3 and queue 2, respectively, when the queues 1 to 7 are in automatic queue selection mode.
Figure 3B:
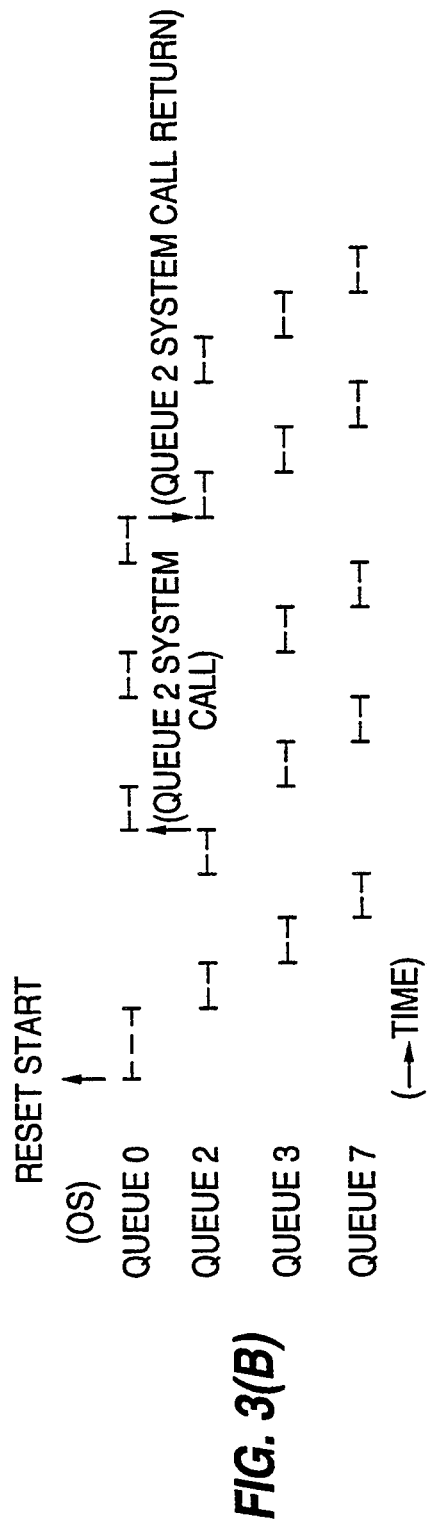
Figure 3C:
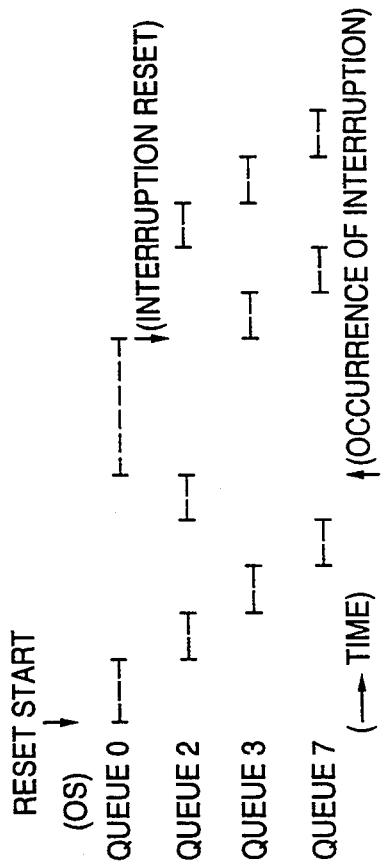
FIG. 3C is a diagram showing an example of an interruption in an automatic queue selection mode.

FIGS. 3A, 3B, 3C are examples of timing charges by which the operating system is executed at queue 0, the user program is executed at queues 2, 3, 7, and automatic queue selection is also executed. The axis of the abscissas denotes time, and the axis of the ordinates shows which key is occupying the CPU at that time. FIGS. 3A, 3B are examples of the occurrence of system call at queues 3 and 2, respectively, in which instead of the queue with the system call, queue 0 is initiated.

In the case of interruption, acceptance of the interruption is processed by priority, and the automatic queue selection is temporarily suspended, and after recovery from interruption, the automatic queue selection mode is resumed. FIG. 3C shows an example of interruption during automatic queue selection mode execution. The queue to be selected automatically may be freely specified from 1 to 7.

Figure 3D:
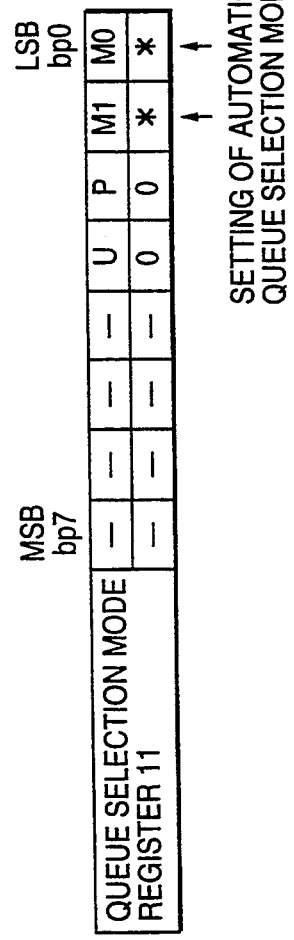
FIGS. 3D, E are diagrams showing a setting method of a register when the queues 1 to 7 are selected automatically.
Figure 3E:
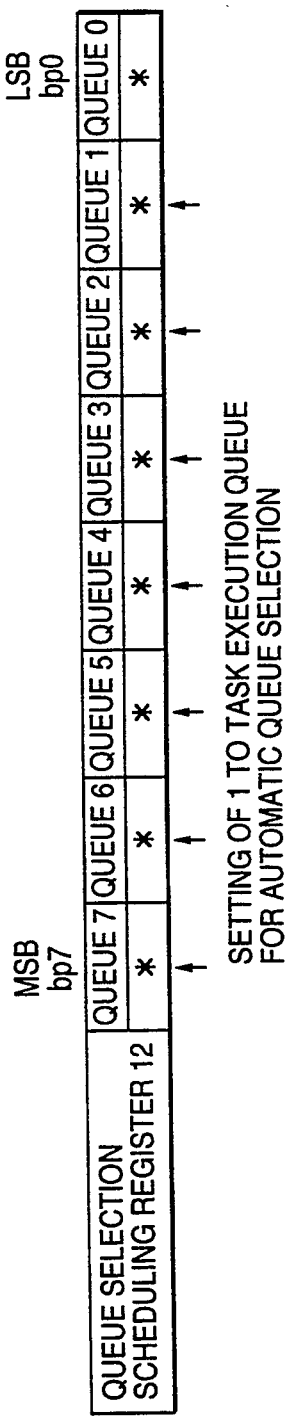

Setting of queue selection mode register 11 for automatic selection of queues 1 to 7 and queue selection scheduling register 12 is shown in FIGS. 3D, 3E.

The automatic queue selection mode is set up by setting 01, 10 or 11 shown in FIG. 2B in M1 flag, M0 flag in the queue selection mode register 11. On the other hand, in the queue selection scheduling register 12, 1 is set in the bit position corresponding to the task execution key for automatic key selection. In the automatic queue selection mode, plural bits may be specified for the necessity of specifying plural queues for executing selection.

Figure 4A:
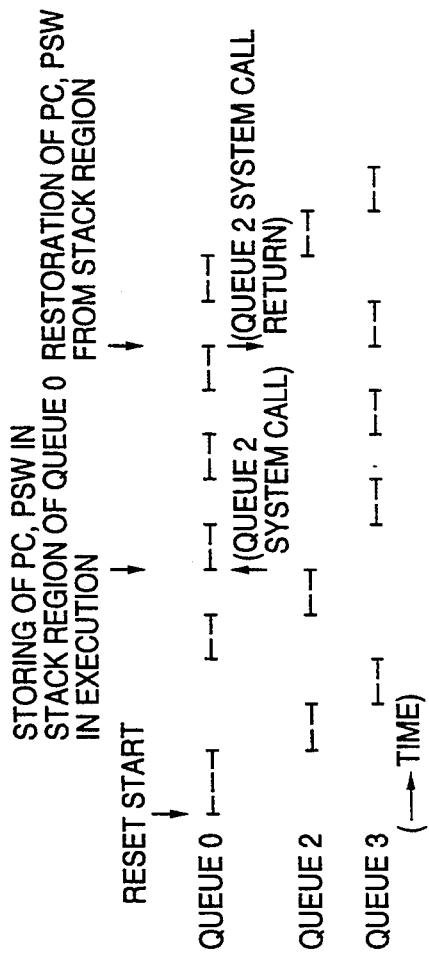
FIG. 4A is a diagram showing an example of a system call in queue 2 when queues 0 to 7 are selected one after another automatically.

(b) When selecting queues 0 to 7 automatically, the queues 0 to 7 are automatically selected incrementally. In the event of system call or interruption, queue 0 is started up, and the program counter (PC) and program status word (PSW) in the register file 8 at queue 0 are stored in the stack area (memory area), and then processing of system call or interruption is started., In the case of system call, the queues 0 to 7 excluding the queue which induced the system call are automatically selected in the sequence from 0 to 7 (the queue which induced system call remains suspended until the system call is over). After recovery from system call, the queues 0 to 7 are selected again automatically in the numerical order. FIG. 4A is an example of a timing chart corresponding to the occurrence of a system call at queue 2.

In the case of interruption, the automatic queue selection mode is temporarily suspended, and the acceptance of interruption is processed by priority. After return from interruption, the automatic queue selection operation is resumed.

Figure 4B:
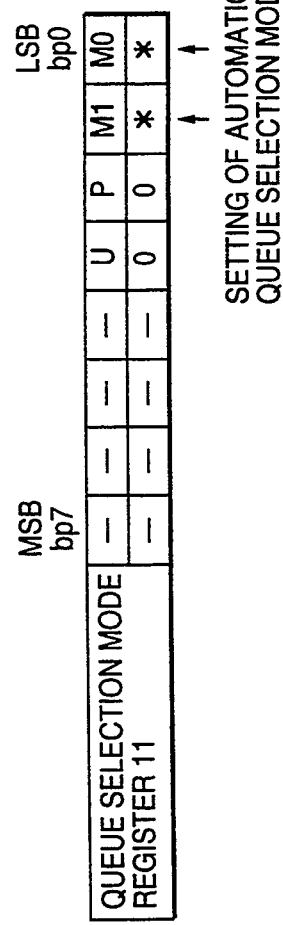
FIGS. 4B, C are diagrams showing a setting method of a register when queues 0 to 7 are selected automatically.
Figure 4C:
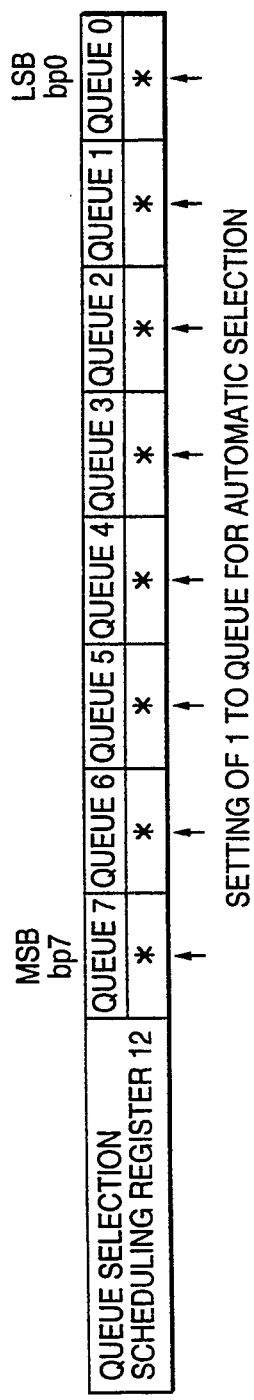

The queues to be selected automatically may be freely specified from 0 to 7. The register setting for automatic queue selection of queues 0 to 7 is shown in FIGS. 4B, 4C. Setting of the flag of queue selection register 11 and the setting method of the value of queue selection scheduling register 12 are the same as in FIGS. 3D, 3E.

Here, as stated above, the following three modes are available as the automatic queue selection execution mode:

(1) Mode for automatically selecting the queues every time one command is executed (command mode).

(2) Mode for executing the selection command of queue by program (program mode).

(3) Mode for occupying the CPU for this time specified by the queue execution schedule time setting register 16 for specifying the queue execution schedule time, and selecting the queues when the time expires (time-slice mode). The basic operation of automatic queue selection execution mode and setting method of register are described below.

Figure 5A:
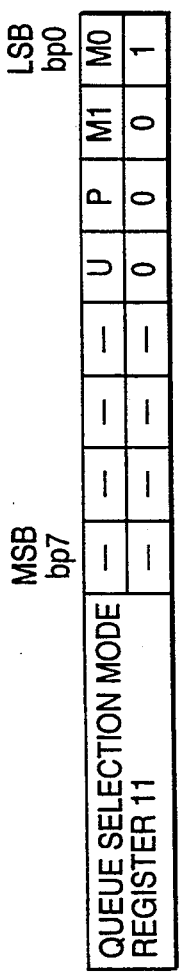
FIGS. 5A, B, C are diagrams showing setting examples and behavior examples of registers in the automatic queue selection mode of each command.
Figure 5B:
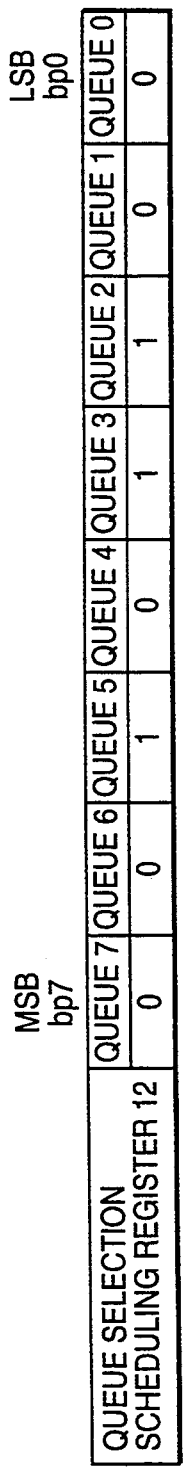
Figure 5C:
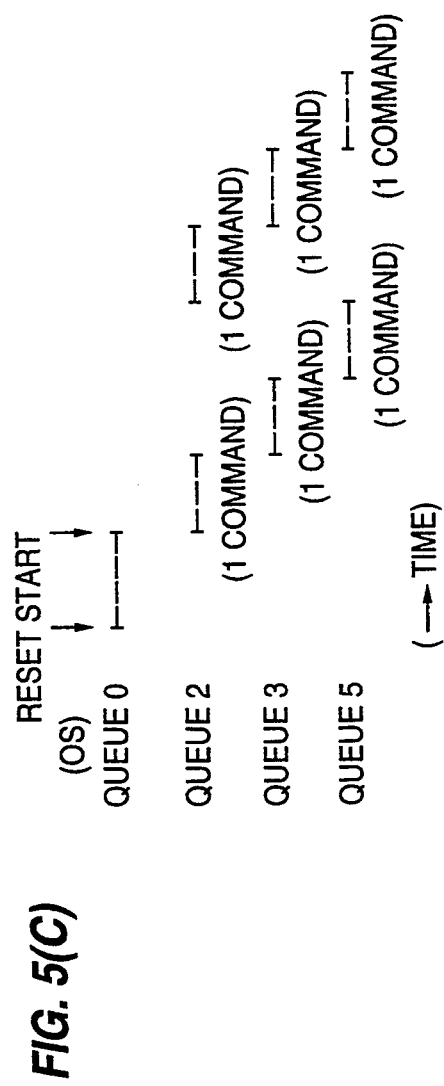

For example, when executing the queues 2, 3, 5 in the automatic queue selection mode of each command (1), the setting is as shown in FIGS. 5A, B, C. That is, by setting M0 flag of queue selection mode register to 1, and M1 flag to 0 to set in this mode (1) for the automatic queue selection mode of each command, and 1 is set in positions of the queues 2, 3, 5 of the queue selection scheduling register 12, so that the execution queues are set in queues 2, 3, 5. By this setting, another queue is selected every time one command is executed.

In the program mode (2), as shown in FIGS. 6A, B, C, M0 flag of queue selection mode register is set to 0 and M1 flag to 1 to set in this program automatic queue selection mode, and the execution queues are set at queues 2, 3, 5 by the queue selection scheduling register 12. By this setting, the queues are selected if the user places the operation to select the queues (setting of P flag) in the program.

Furthermore, in the time-slice mode (3), as shown in FIGS. 7A, B, C, D, both M0 flag and M1 flag of the queue selection mode register 11 are set to 1 to set in the time-slice mode (3), and the execution queues are set at queues 2, 3, 5 by the queue selection scheduling register 12. By this setting, the queues are selected according to the predetermined time-slice data. In this example, the queue execution time is set by the queue execution schedule time setting register 16 (see FIG. 2G) as follows:

queue execution schedule time setting register b (for queues 3, 2)=71H, queue execution schedule time setting register c (for queues 5, 4)=50H, (where H denotes hexadecimal expression) and therefore execution schedule time of queue 2 is 1H, execution schedule time of queue 3 is 7H, execution schedule time of queue 4 is 0H, execution schedule time of queue 5 is 5H, hence the execution priority of the queues 2, 3, 5 is (task of queues 3)>(task of queue 5)>(task of queue 2).

It is thus possible to set the priority of tasks by weighting the CPU time of the tasks.

The register setting procedure of the automatic queue selection operation described above can be summarized as follows.

1) The running queue is transferred to queue 0.

2) The automatic queue selection mode is set by M1, M0 flags in the queue selection mode register 11.

3) When the queue selection scheduling register 12 is set, the automatic queue selection is initialed. One flag corresponds to one queue.

4) In the case of the program automatic queue selection mode, the P flag in the queue selection mode register 11 is set to 1. The P flag is set to 0 after the execution of the next queue begins.

Figures 8A, 8B, 8C:
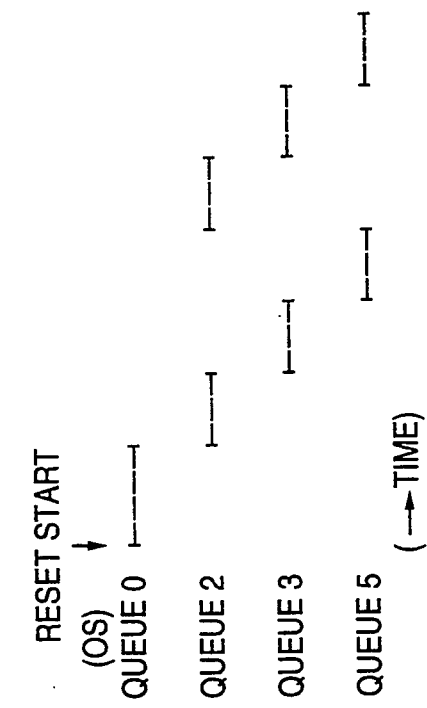
FIGS. 8A, B, C are diagrams showing setting examples and behavior examples of registers when queue 0 is not selected automatically (when actuating the operating system by queue 0) in the automatic queue selection mode of each command.

Practical setting examples and operation examples of the register for queue selection are explained below. FIGS. 8A, B, B refer to the command mode (1), in which queue 0 is not selected automatically (when actuating the operating system at queue 0). The register operation is as follows.

a) The running queue is transferred to queue 0.

b) Each flag in the queue selection mode register 11 is set as shown in FIG. 8A.

c) The value of the queue selection scheduling register 12 is set as shown in FIG. 8B, and the queue for automatic selection is specified.

The actual operation is as shown in FIG. 8C.

FIGS. 9A, B, C show the case in which the queue 0 is also automatically selected in the same command mode (1). The register operation is as follows.

a) The running queue is transferred to queue 0.

b) Each flag in the queue selection mode register 11 is set as shown in FIG. 9A.

c) The value of the queue selection scheduling register 12 is set as shown in FIG. 9B, and the queue for selection is specified.

The actual operation is as shown in FIG. 9C.

FIGS. 10A, B, C, D relate to the program mode (2). The register operation is as follows.

a) The running queue is transferred to queue 0.

b) Each flag in the queue selection mode register 11 is set as shown in FIG. 10A.

c) The value of the queue selection scheduling register 12 is set as shown in FIG. 10B, and the queue for automatic selection is specified.

d) When selecting the queues, the P flag in the queue selection mode register 11 is set as shown in FIG. 10C.

The actual operation is as shown in FIG. 10D.

FIGS. 11A, B show the queue selection by the operating system (queue 0) control. The register operation is as follows.

a) The running queue is transferred to queue 0.

b) Each flag in the queue selection mode register 11 is set as shown in FIG. 11A.

c) The operating system sets the value of the queue selection scheduling register 12, and selects the queues.

d) To return to queue 0.

○ Scheduling by time.

○ System call of task WAIT, etc. and other methods are available.

The actual action is shown in FIG. 11B. In this case, the one of queue 0 to 7 which is to be executed is determined by the operating system, and the running queue is expressed as queue a, b, c in FIG. 11B.

FIGS. 12A, B show the queue selection by rewriting the value of the queue selection scheduling register 12 (the program queue selection without resort to the operating system). The register operation is as follows.

a) The running queue is transferred to queue 0.

b) Each flag in the queue selection mode register 11 is set as shown in FIG. 12A.

The actual operation is as shown in FIG. 12B.

The interruption processing in the automatic queue selection modes (1), (2), (3) is explained below. FIG. 13 shows the basic operation of the interruption processing. The interruption is accepted by queue 0 by the first priority. As a result of the onset of interruption, the automatic queue selection mode is temporarily suspended, and the interruption is accepted by the first priority. In the example shown in FIG. 13.

1) An interruption occurs while executing queue 3 in the automatic queue selection of queues 2, 3, 7.

2) In sequence a of queue 0, the automatic queue selection mode is temporarily suspended, and the interruption is processed by priority. When the interruption processing is over, and the interruption reset command is executed, the automatic queue selection is resumed (queues 2,3,7 are automatically selected).

The operation corresponding to the timing charts in FIGS. 14A, B is as follows.

1) In the automatic queue selection setting of queues 2, 3, 7 an interruption occurs while executing queue 3.

2) In sequence b of queue 0, the automatic queue selection mode is temporarily suspended, and the interruption is processed by priority. The task generated by interruption processing is executed by queue 6, and in order to successively execute the tasks by the queues 2, 3, 7, the automatic queue selection is set again at the point c of sequence b. (Thereafter, the queues 2, 3, 6, 7 are automatically selected.)

The action in FIG. 15 is as follows, in which the interruption priority order is (interruption x)<(interruption y).

1) An interruption occurs while executing the queue 3 in automatic queue selection of queues 2, 3, 7.

2) In sequence d of queue 0, the automatic queue selection mode is temporarily suspended, and the interruption x is processed by priority.

3) An interruption y occurs while executing sequence d of queue 0, and the priority of interruption y is higher than that of interruption x, so that the interruption y is processed in sequence e.

4) After processing of interruption y (after interruption of sequence e is over), the interruption x is successively processed in queue 0, and by the interruption reset command of sequence f, the automatic queue selection of queues 2, 3, 7 is resumed.

FIG. 16 shows a case of interruption during a system call processing.

1) While the queues 2, 3, 7 are automatically selected, a system call occurs at queue 3, and is accepted at queue 0, and then the queues 0, 2, 7 are automatically selected.

2) In automatic queue selection of queues 0, 2, 7, an interruption occurs while executing queue 2.

3) In sequence g of queue 0, the automatic queue selection mode is temporarily suspended, and the interruption is processed by priority. After the sequence g, when restored from the interruption by an interruption reset command, the automatic queue selection of queues 0, 2, 7 is resumed form sequence h, and the system call processing form queue 3 is resumed in queue 0.

Figure 17:
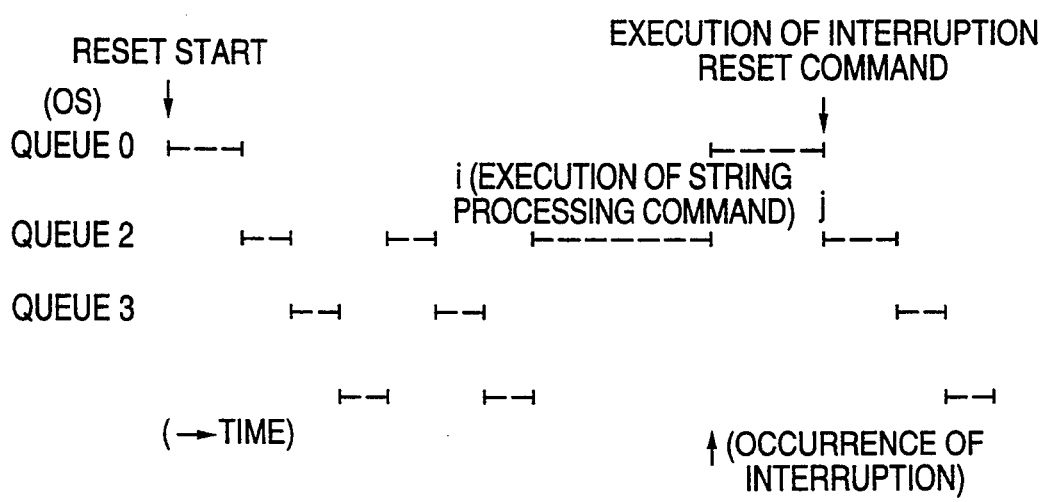
FIG. 17 is a diagram showing the action of interruption during execution of a string processing command.

FIG. 17 shows a case of interruption during string processing command execution. The string processing command denotes the continuous processing command to a one-dimensional array such as character string, that is, a set of data continuously arranged in an arbitrary length.

1) By automatic queue selection of queues 2, 3, 6, an interruption occurs during string processing command execution of sequence i of queue 2. When the interruption takes place during string processing command execution, necessary data such as an operation code and operand are stored, and the automatic queue selection is temporarily suspended, and the interruption is accepted by queue 0.

2) After interruption processing at queue 0, the interruption return command is executed, and the automatic queue selection mode is resumed. The string processing command processing at queue 2 is successively executed in sequence j.

What is claimed is:

1. A time-shared multitask execution device comprising:

a communication bus;
 a processing unit operatively coupled to said communication bus;
 a plurality of task execution queues, operatively coupled to said communication bus, each having a register file storing at least address data identifying one of a plurality of programs respectively associated with multiple tasks;
 memory means, operatively coupled to said communication bus, for storing said plurality of programs;
 queue selection control means, operatively coupled to said communication bus, for sequentially selecting one at a time said plurality task execution queues; and
 program counter means, responsive to said address data from said register file of each of said plurality of task execution queues selected by said queue selection control means, for sequentially providing, via said communication bus, said processing unit one at a time with said plurality of programs stored in said memory means so as to sequentially execute one at a time said multiple tasks;
 control register group means, having selection information contained therein and operatively coupled to said queue selection control means, for controlling, according to said selection information, said selection and a timing of said selection carried out by said queue selection control means;
 wherein, responsive to said control register group means and said queue selection control means, said processing unit is sequentially occupied one at a time by said plurality of programs corresponding to said plurality of task execution queues so as to execute said multiple tasks of said plurality of task execution queues in a time-shared manner.

2. A device as recited in claim 1, wherein said control register group means includes a queue selection mode register for specifying one of a plurality of queue selection modes each specifying a selection criteria to be carried out using said queue selection control means.

3. A device as recited in claim 1, wherein said control register group means includes a queue selection scheduling register for specifying at least one of said plurality of task execution queues to be selected by said queue selection control means.

4. A device as recited in claim 3, wherein said control register group means includes a queue execution schedule time setting register for setting an occupation time of said processing unit for each of said plurality of task execution queues.

5. A time-shared multitask execution device comprising:

a communication bus;
 a processing unit operatively coupled to said communication bus;
 a plurality of task execution queues, operatively coupled to said communication bus, each having a register file storing at least address data identifying one of a plurality of programs respectively associated with multiple tasks;
 memory means, operatively coupled to said communication bus, for storing said plurality of programs;
 queue selection control means, operatively coupled to said communication bus, for sequentially selecting one at a time said plurality of task execution queues;
 program counter means, responsive to said address data from said register file of each said plurality of task execution queues selected by said queue selection control means, for sequentially providing, via said communication bus, said processing unit one at a time with said plurality of programs stored in said memory means so as to sequentially execute one at a time said multiple tasks;
 control register group means, having selection information contained therein and operatively coupled to said queue selection control means, for controlling, according to said selection information, said selection and a timing of said selection carried out by said queue selection control means, said control register group means including a queue selection scheduling register for specifying two or more of said plurality of task execution queues to be selected by said queue selection control means, and a running queue register for storing identification data representing a task execution queue identifying a program which is currently being executed;
 said program counter means, by referring to said queue selection scheduling register and said running queue register, being ready for reading an address data of a next task execution queue upon a completion of the execution of a program identified by a previous task execution queue;
 wherein, responsive to said control register group means and said queue selection control means, said processing unit is sequentially occupied one at a time by said plurality of programs corresponding to said plurality of task execution queues so as to execute said multiple tasks of said plurality of task execution queues in a time-shared manner.

* * * * *